US007627285B2

(12) United States Patent
Karabinis

(10) Patent No.: US 7,627,285 B2
(45) Date of Patent: Dec. 1, 2009

(54) SATELLITE COMMUNICATIONS SYSTEMS AND METHODS WITH DISTRIBUTED AND/OR CENTRALIZED ARCHITECTURE INCLUDING GROUND-BASED BEAM FORMING

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 876 days.

(21) Appl. No.: 11/374,191

(22) Filed: Mar. 13, 2006

(65) Prior Publication Data
US 2006/0205347 A1    Sep. 14, 2006

Related U.S. Application Data

(60) Provisional application No. 60/661,364, filed on Mar. 14, 2005.

(51) Int. Cl.
H04B 7/185 (2006.01)
H04B 7/19 (2006.01)
H04B 7/14 (2006.01)

(52) U.S. Cl. ............... 455/13.3; 455/13.2; 455/12.1; 455/15

(58) Field of Classification Search ........... 455/13.2, 455/13.3, 12.1, 15
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,697,050 A * | 12/1997 | Wiedeman ............ 455/12.1 |
| 5,761,605 A | 6/1998 | Tawil et al. |
| 5,765,098 A | 6/1998 | Bella |

(Continued)

FOREIGN PATENT DOCUMENTS

EP    0 506 255 A2    9/1992

(Continued)

OTHER PUBLICATIONS

U.S. Appl. No. 11/324,711, "Adaptive Beam Forming with Multi-User Detection and Interference Reduction in Satellite Communications Systems and Methods," filed Jan. 3, 2006.

(Continued)

Primary Examiner—Matthew D Anderson
Assistant Examiner—Bobbak Safaipour
(74) Attorney, Agent, or Firm—Myers Bigel Sibley & Sajovec, P.A.

(57) ABSTRACT

A space-based component (SBC) of a communications system includes a service link subsystem including a plurality of service link antenna elements configured to provide service links with radioterminals and a feeder link subsystem configured to provide respective feeder links to/from respective processing facilities. The SBC further includes a channelizer configured to map different spectral components of a signal received at the SBC via a service link antenna element to different feeder links.

25 Claims, 8 Drawing Sheets

U.S. PATENT DOCUMENTS

| | | |
|---|---|---|
| 5,790,529 A | 8/1998 | Haber |
| 5,812,947 A | 9/1998 | Dent |
| 5,826,170 A * | 10/1998 | Hirschfield et al. ........ 455/13.4 |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,317,583 B1 * | 11/2001 | Wolcott et al. ............. 455/12.1 |
| 6,324,405 B1 | 11/2001 | Young et al. |
| 6,339,707 B1 | 1/2002 | Wainfan et al. |
| 6,418,147 B1 | 7/2002 | Wiedeman |
| 6,442,148 B1 | 8/2002 | Adams et al. |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,823,170 B1 * | 11/2004 | Dent ........................ 455/13.3 |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,058,403 B2 * | 6/2006 | Zhao et al. ............... 455/435.1 |
| 7,062,267 B2 | 6/2006 | Karabinis |
| 7,305,211 B2 * | 12/2007 | Dent ........................ 455/12.1 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0045289 A1 * | 3/2003 | Zhao et al. ................. 455/435 |
| 2003/0054761 A1 | 3/2003 | Karabinis |
| 2003/0054762 A1 | 3/2003 | Karabinis |
| 2003/0054815 A1 | 3/2003 | Karabinis |
| 2003/0068978 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0185775 A1 | 9/2004 | Bell et al. |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0253949 A1 * | 12/2004 | Swensen et al. .......... 455/422.1 |
| 2004/0259497 A1 * | 12/2004 | Dent ........................ 455/13.3 |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 * | 10/2005 | Levin et al. ................. 455/431 |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 * | 12/2005 | Dutta ........................ 455/427 |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0135058 A1 | 6/2006 | Karabinis |
| 2006/0135060 A1 | 6/2006 | Karabinis |
| 2006/0135070 A1 | 6/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Global.com, "Globalstar Demonstrates World's First Prototype of Terrestrial System to Supplemental Satellite Phones," http://www.qlobalcomsatphone.com/globalcom/globalstar_terrestrial:_system.html, Jul. 18, 2002, 2 pages.

Ayyagari et al., "A satellite-augmented cellular network concept", *Wireless Networks*, Vo. 4, 1998, pp. 189-198.

International Search Report and the Written Opinion of the International Searching Authority, PCT/US2006/009206, Aug. 7, 2006.

* cited by examiner

SATELLITE COMMUNICATIONS SYSTEMS AND METHODS WITH DISTRIBUTED AND/OR CENTRALIZED ARCHITECTURE INCLUDING GROUND-BASED BEAM FORMING

RELATED APPLICATION

The present application claims the benefit of U.S. Provisional Application Ser. No. 60/661,364, filed Mar. 14, 2005, the disclosure of which is hereby incorporated by reference herein in its entirety.

FIELD OF THE INVENTION

This invention relates to wireless communications systems and methods, and more particularly to satellite communications systems and methods.

BACKGROUND OF THE INVENTION

Satellite radioterminal communications systems and methods are widely used for radioterminal communications. Satellite radioterminal communications systems and methods generally employ at least one space-based component, such as one or more satellites that is/are configured to wirelessly communicate with a plurality of satellite radioterminals.

A satellite radioterminal communications system or method may utilize a single antenna pattern (i.e., a global beam) to cover an entire area served by the system. Alternatively, or in combination with the above, in cellular satellite radioterminal communications systems and methods, multiple antenna patterns (i.e., beams or cells) are provided, each of which can serve a substantially distinct geographical area in an overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communications signals being communicated from the satellite to the radioterminal over a service downlink (forward-link), and from the radioterminal to the satellite over a service uplink (return-link).

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet and/or Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," a "mobile terminal," a "mobile user device," a "user device" or simply as a "terminal." Furthermore, as used herein, the term "space-based component" or "space-based system" includes one or more satellites at any orbit (geostationary, substantially geostationary, medium earth orbit, low earth orbit, etc.) and/or one or more other objects and/or platforms (e. g., airplanes, balloons, unmanned vehicles, space crafts, missiles, etc.) that has/have a trajectory above the earth at any altitude.

Cellular satellite communications systems and methods may deploy hundreds of antenna patterns, each of which may correspond to one or more spot beams or cells, over a satellite footprint corresponding to a service area. It will be understood that large numbers of cells may be generally desirable, since a frequency reuse and a capacity of a cellular satellite communications system or method may both increase in direct proportion to the number of cells. Moreover, for a given satellite footprint or service area, increasing the number of cells may also provide a higher gain per cell, which can increase a link robustness and improve a quality of service.

The uplink and/or downlink communications between wireless terminals and a space-based component (e.g., a satellite) may utilize one or more air interfaces, including proprietary air interfaces and/or conventional terrestrial cellular/PCS interfaces, such as, for example, Time Division Multiplexed (TDM) and/or Time Division Multiple Access (TDMA), Code Division Multiplexed (CDM) and/or Code Division Multiple Access (CDMA), Frequency Division Multiplexed (FDM) and/or Frequency Division Multiple Access (FDMA), Orthogonal Frequency Division Multiplexed (OFDM) and/or Orthogonal Frequency Division Multiple Access (OFDMA) air interfaces and/or various adaptations and/or combinations thereof. A single air interface may be used throughout the cellular satellite system. Alternatively, multiple air interfaces may be used for the satellite communications. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell generally uses at least one carrier and/or channel to provide signaling and/or communications service in a specified direction (forward or return). Thus, each satellite cell (satellite beam or satellite antenna pattern) must generally be configured to provide at least one return service link (carrier and/or channel) and at least one forward service link (carrier and/or channel) to serve at least one radioterminal.

As is well known to those having skill in the art, a terrestrial network can enhance an availability, efficiency and/or economic viability of a satellite radioterminal system by terrestrially using/reusing at least some of the frequencies that are allocated to the cellular satellite radioterminal system. In particular, it is known that it may be difficult for the cellular satellite radioterminal system to reliably serve densely populated areas, because satellite signals may be blocked by high-rise structures and/or may not penetrate into buildings. As a result, satellite frequencies may be underutilized or unutilized in such areas. The use of terrestrial transmission and/or retransmission of all or some of the satellite band frequencies can reduce or eliminate this problem.

Moreover, a capacity of an overall hybrid system, comprising space-based (e.g., satellite) and terrestrial communications capability, can be increased significantly by the introduction of terrestrial transmission/retransmission, since terrestrial frequency use/reuse can be much denser than that of a space-based-only system. In fact, capacity can be enhanced where it may be mostly needed, i.e., in and/or proximate to densely populated urban, industrial, and/or commercial areas. As a result, the overall hybrid system can become much more economically viable, as it may be able to serve a much larger subscriber base. Finally, radioterminals for a hybrid system, wherein space-based and terrestrial communications are provided within a common frequency band (e.g., within a frequency band authorized for use by a space-based component of the hybrid system) using substantially the same air interface for both terrestrial and space-based communications can be more cost effective and/or aesthetically appealing. Exemplary conventional dual band and dual mode satellite and terrestrial radiotelephone systems include Thuraya, Iridium and Globalstar.

U.S. Pat. No. 6,684,057 issued Jan. 27, 2004, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radioterminal frequency can be reused terrestrially by an ancillary terrestrial network even within the same satellite cell, using interference cancellation techniques. In particular, the satellite radioterminal system according to some embodiments of U.S. Pat. No. 6,684,057 includes a space-based component that is configured to receive wireless communications from a first radioterminal in a satellite footprint over a satellite radioterminal frequency band, and an ancillary terrestrial network that is configured to receive wireless communications from a second radioterminal in the satellite footprint over the satellite radioterminal frequency band. The space-based component also receives the wireless communications from the second radioterminal in the satellite footprint over the satellite radioterminal frequency band as interference, along with the wireless communications that are received from the first radioterminal in the satellite footprint over the satellite radioterminal frequency band. An interference reducer is configured to reduce the interference from the wireless communications that are received by the space-based component from the first radioterminal in the satellite footprint over the satellite radioterminal frequency band, using the wireless communications that are received by the ancillary terrestrial network from the second radioterminal in the satellite footprint over the satellite radioterminal frequency band.

United States Patent Application Publication No. 2003/0054761 A1, published Mar. 20, 2003 to the present inventor Karabinis and entitled Spatial Guardbands for Terrestrial Reuse of Satellite Frequencies, the disclosure of which is hereby incorporated herein by reference in its entirety as if set forth fully herein, describes satellite radioterminal systems that include a space-based component that is configured to provide wireless radioterminal communications in a satellite footprint over a satellite radioterminal frequency band. The satellite footprint is divided into a plurality of satellite cells, in which satellite radioterminal frequencies of the satellite radioterminal frequency band are spatially reused. An ancillary terrestrial network is configured to terrestrially reuse at least one of the radioterminal frequencies that is used in a satellite cell in the satellite footprint, outside the cell and in some embodiments separated therefrom by a spatial guardband. The spatial guardband may be sufficiently large to reduce or prevent interference between the at least one of the satellite radioterminal frequencies that is used in the satellite cell in the satellite footprint, and the at least one of the satellite radioterminal frequencies that is terrestrially reused outside the satellite cell and separated therefrom by the spatial guardband. The spatial guardband may be about half a radius of a satellite cell in width.

Various beam forming techniques may be used to enhance performance in satellite communications systems. United States Patent Application Publication No. US 2003/0054815 A1, published Mar. 20, 2003 to the present inventor Karabinis, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radioterminal communications are provided in a satellite footprint over a satellite radioterminal frequency band. The satellite footprint is divided into satellite cells in which satellite radioterminal frequencies of the satellite radioterminal frequency band are spatially reused. At least one of the satellite radioterminal frequencies that is assigned to a given satellite cell in the satellite footprint is terrestrially reused outside the given satellite cell. A radiation pattern of at least the given satellite cell is modified to reduce interference with the at least one of the satellite radioterminal frequencies that is terrestrially reused outside the given satellite cell.

A U.S. patent application Ser. No. 11/324,711, entitled Adaptive Beam Forming with Multi-User Detection and Interference Reduction in Satellite Communications Systems and Methods, filed Jan. 3, 2006, the disclosure of which is hereby incorporated herein by reference in its entirety as if set forth fully herein, describes receiving multiple access signals at a space-based component from a plurality of terminals in a satellite footprint over a satellite frequency band. Multiple access signals may be received using an antenna including a plurality of antenna feed elements that may be configured to provide antenna patterns that differ in spatial orientations therebetween, wherein at least some of the antenna feed elements may also be configured to receive electromagnetic energy over at least two different polarization orientations.

The above description has focused on communications between a satellite and wireless terminals. However, cellular satellite communications systems and methods also generally employ a bidirectional feeder link for communications between a satellite gateway and the satellite. The bidirectional feeder link includes a forward feeder link from the gateway to the satellite and a return feeder link from the satellite to the gateway. The forward feeder link and the return feeder link each use one or more feeder link carriers and/or channels of a feeder link band of frequencies.

United States Patent Application Publication No. US 2005/028801 A1, published Dec. 29, 2005, to Santanu Dutta and entitled Methods of Ground Based Beamforming and On-Board Frequency Translation and Related Systems, the disclosure of which is hereby incorporated herein by reference in its entirety as if set forth fully herein, describes that a feeder link may be provided between a satellite and a satellite gateway over a feeder link frequency band for communication of information between the satellite gateway and the satellite. A service link may be provided between the satellite and at least one radioterminal in a coverage area of the satellite over a service link frequency band, and the feeder link and service link frequency bands may be different. In addition, a frequency segment of the feeder link may be linearly translated from the feeder link frequency band to the service link frequency band to provide a frequency segment of the service link. The frequency segment of the service link may provide content for the at least one radioterminal and/or for a plurality of radioterminals in the coverage area.

United States Patent Application Publication No. US 2005/0260947 A1, published Nov. 24, 2005 to the present inventor Karabinis, entitled Satellite Communications Systems and Methods Using Radiotelephone Location-Based Beamforming, the disclosure of which is hereby incorporated herein by reference in its entirety as if set forth fully herein, describes that a return-link processor for use in a satellite communications system may include a selector that is configured to select a subset of a plurality of spatially diverse satellite signals, i.e., signals having diverse spatial content, based upon a location of a radioterminal. The return-link processor may further include a signal processor that is configured to detect a return-link transmission from the radioterminal responsive to the selected subset of the spatially diverse satellite signals.

SUMMARY OF THE INVENTION

In some embodiments of the present invention, a space-based component (SBC) of a communications system includes a plurality of service link antenna elements configured to transmit/receive information to/from radioterminal and a plurality of feeder links each providing information to/from a respective processing facility. The SBC further includes a channelizer configured to map different spectral components of a service link signal received at the SBC via a service link antenna element to different feeder links of the plurality of feeder links and/or to map different spectral components of a feeder link signal received at the SBC via a feeder link to different service link antenna elements. The channelizer may be further configured to map different polarization components of a service link signal received at the SBC to different polarization components of a feeder link. At least some of the feeder links may reuse feeder link frequencies. In some embodiments, the channelizer is further configured to frequency translate service link signal components routed between the service link antenna elements and the feeder links. According to further embodiments, the SBC further includes a feeder link subsystem configured to provide a plurality of spatially diverse antenna patterns for the plurality of feeder links.

In additional embodiments of the present invention, the plurality of service link antenna elements comprises a first group of service link antenna elements corresponding to a first service region of the SBC and a second group of service link antenna elements corresponding to a second service region of the SBC. The channelizer is configured to map different spectral components of a service link signal received at the SBC by a service link antenna element of the first group of service link antenna elements to different feeder links of a first group of feeder links and to map different spectral components of a service link signal received at the SBC by a service link antenna element of the second group of service link antenna elements to different feeder links of a second group of feeder links. The first and second service regions may be substantially non-overlapping service regions served by respective first and second service providers. The channelizer may be further configured to map different spectral components of a service link signal received at the SBC by a service link antenna element of the second group of service link antenna elements to different feeder links of the first group of feeder links. The first and second service providers may be allocated first and second sets of frequencies, and the first service provider may use at least one frequency of the second set of frequencies to provide service to at least a portion of the first service region. The first and second sets of frequencies may be, for example, frequencies of a L-band and/or S-band.

In additional embodiments of the present invention, a communications system comprises an SBC as described above and a plurality of processing facilities. The system may further comprise an aggregation facility configured to receive return feeder link signals from the plurality of processing facilities and to combine elements of the received return feeder link signals to recover return service link signals therefrom. The system may also include a separation facility configured to separate an aggregate of forward link communications into components and to provide respective ones of the components to respective ones of the plurality of processing facilities for transmission to the SBC. The channelizer may be configured to frequency translate service link signal components routed between the service link antenna elements and the feeder links, and the plurality of processing facilities may be configured to perform complementary frequency translations.

Some embodiments of the present invention provide a processing facility for communicating with a space-based component (SBC) that uses a set of service link frequencies for radioterminal service link communications. The processing facility is configured to provide a feeder link to the SBC that carries radioterminal communications for a subset of the set of service link frequencies. The SBC may frequency translate service link signal components routed between service link antenna elements and the feeder link and the processing facility may be configured to perform complementary frequency translations. The SBC may serve first and second service regions of respective first and second service providers and may communicate radioterminal communications for the first and second service regions over a plurality of feeder links.

In additional embodiments of the present invention, a processing facility for communicating with a space-based component (SBC) that uses a set of service link frequencies for radioterminal service link communications includes a plurality of processing facilities configured to provide respective feeder links to the SBC that carry radioterminal communications for respective subsets of the set of service link frequencies. At least some of the feeder links may reuse feeder link frequencies. The SBC may frequency translate service link signal components routed between service link antenna elements and the feeder links and the plurality of processing facilities may be configured to perform complementary frequency translations. The processing facility may further include an aggregation facility configured to receive feeder link signals from the plurality of ground stations, to combine elements of the feeder link signals and to recover radioterminal return service link signals therefrom. The processing facility may further include a separation facility configured to separate an aggregate of forward link communications into components and to provide respective ones of the components to respective ones of the plurality of processing facilities for transmission to the SBC. The feeder links may use spatially diverse antenna patterns.

Further embodiments of the present invention provide methods of operating a communications system. Different spectral components of a service link signal received at a space-based component (SBC) of the communications system via a service link antenna element of the SBC are mapped to different feeder links between the SBC and respective processing facilities. Service link signal components routed between service link antenna elements and feeder links may be frequency translated. Respective spatially diverse antenna patterns may be used for respective feeder links. At least some feeder links may reuse feeder link frequencies. Mapping different spectral components of a service link signal received at a space-based component (SBC) of the communications system via a service link antenna element of the SBC to different feeder links between the SBC and respective processing facilities may include mapping different spectral components of a service link signal received at the SBC via a service link antenna element to different feeder links and/or mapping different spectral components of a feeder link signal received at the SBC via a feeder link to different service link antenna elements.

In further embodiments, the SBC comprises a plurality of service link antenna elements comprising a first group of service link antenna elements corresponding to a first service region and a second group of service link antenna elements corresponding to a second service region. Mapping different spectral components of a service link signal received at a space-based component (SBC) of the communications system via a service link antenna element of the SBC to different feeder links between the SBC and respective processing facilities may include mapping different spectral components of a service link signal received at a service link antenna element of the first group of service link antenna elements to different feeder links of a first group of the feeder links and mapping different spectral components of a service link signal received at a service link antenna element of the second group of service link antenna elements to different feeder links of a second group of the feeder links. The first and second service regions may be substantially non-overlapping service regions served by respective first and second service providers. Different spectral components of a service link signal received at the SBC by a service link antenna element of the second group of service link antenna elements may be mapped to different feeder links of the first group of feeder links. The first and second service providers may be allocated first and second sets of frequencies, and the first service provider may use at least one frequency of the second set of frequencies to provide service to at least a portion of the first service region. The first and second sets of frequencies may be frequencies of a L-band and/or S-band.

In additional embodiments, return feeder link signals may be received over a plurality of feeder links at a respective ones of a plurality of processing facilities and elements of the received return feeder link signals may be combined to recover return service link signals therefrom. An aggregate of forward link communications may be separated into components and respective ones of the components may be provided to respective ones of processing facilities for transmission to the SBC. Service link signal components routed between service link antenna elements and feeder links may be frequency translated, and a complementary frequency translation may be performed at processing facilities.

Some embodiments of the present invention provide methods of operating a processing facility for communicating with a space-based component (SBC) that uses a set of service link frequencies for radioterminal service link communications. A feeder link is provided between the processing facility and the SBC that carries radioterminal communications for a subset of the set of service link frequencies. The SBC may frequency translate service link signal components routed between service link antenna elements and the feeder link and a complementary frequency translation may be performed at the processing facility. The SBC may serve first and second service regions of respective first and second service providers.

Further embodiments provide methods of operating processing facilities for communicating with a space-based component (SBC) that uses a set of service link frequencies for radioterminal service link communications. A plurality of processing facilities provide respective feeder links to the SBC that carry radioterminal communications for respective subsets of the set of service link frequencies. At least some of the feeder links may reuse feeder link frequencies. The SBC may frequency translate service link signal components routed between service link antenna elements and the feeder links and a complementary frequency translation may be performed at the plurality of processing facilities. Elements of feeder link signals from the plurality of processing facilities may be combined to recover radioterminal return service link signals therefrom. An aggregate of forward link communications may be separated into components and respective ones of the components may be provided to respective ones of the plurality of processing facilities for transmission to the SBC. The feeder links may use spatially diverse antenna patterns.

DETAILED DESCRIPTION

Figure 1:
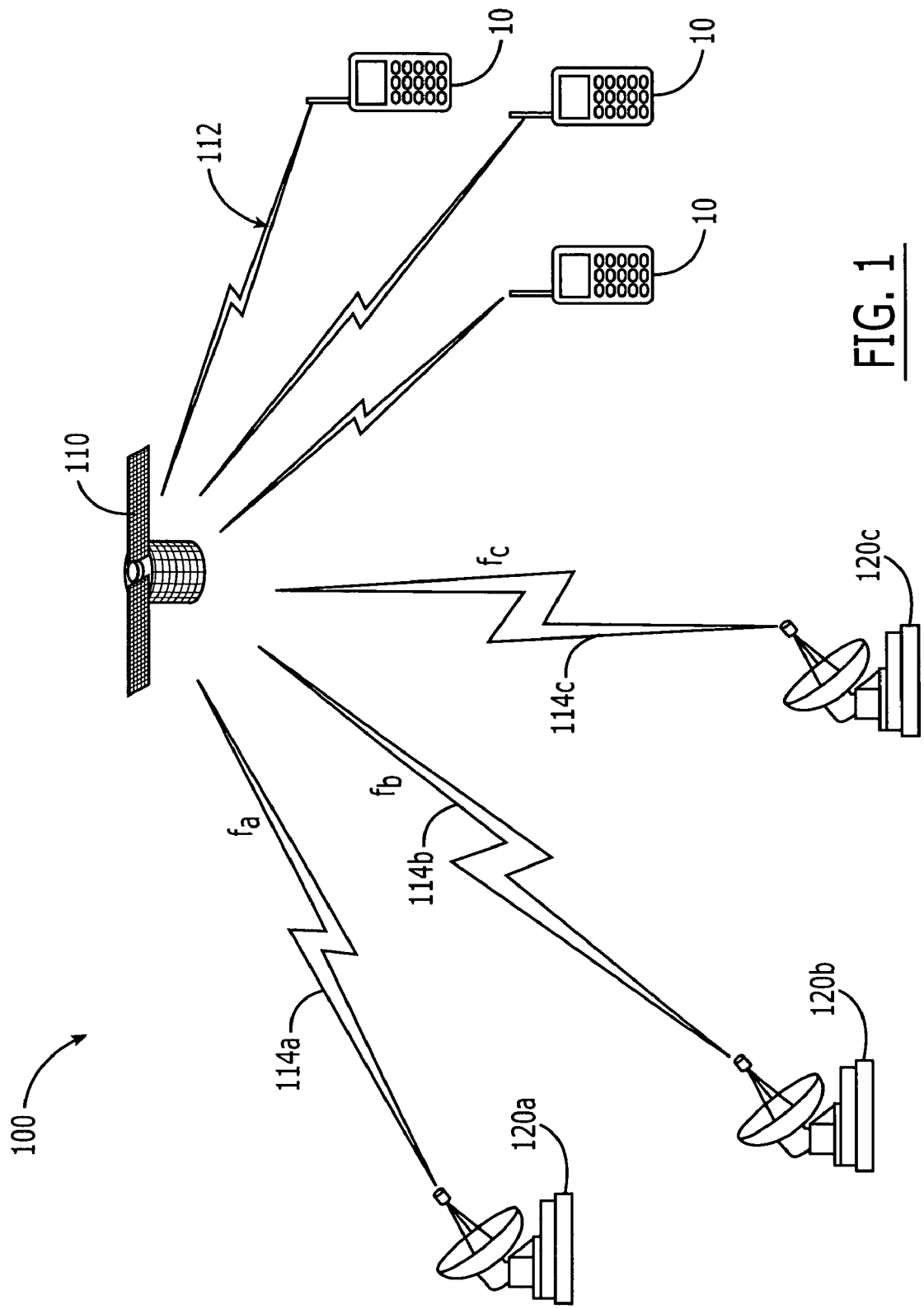
FIG. 1 is a schematic diagram illustrating use of spectrally diverse feeder links between ground stations and a space-based component (SBC) of a communications system according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap in frequency, but that there may be some areas of non-overlap, for example at a band end and/or elsewhere. "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

A Space-Based Component (SBC), such as a satellite, may be configured to perform return link signal processing relating to Ground-Based Beam Forming (GBBF) wherein a first plurality of signals, corresponding to a plurality of return service link antenna elements (also referred to as return service link antenna feed elements) of the SBC, are transported by the SBC via one or more return feeder links to a processing facility (e.g., a ground facility such as one or more satellite gateways). The SBC may also be configured to perform forward link signal processing relating to GBBF wherein a second plurality of signals, corresponding to a plurality of forward service link antenna elements (also referred to as forward service link antenna feed elements) of the SBC are transported from a processing facility (e.g., a ground facility, such as one or more satellite gateways), via one or more forward feeder links to the SBC and to the respective plurality of forward service link antenna elements of the SBC. It will be understood that the term GBBF as used herein includes any type of antenna pattern forming, corresponding to a forward and/or return link of the SBC, irrespective of whether the antenna pattern forming is performed at a ground-based facility (fixed, transportable or mobile), at a maritime facility, at an aeronautical facility and/or in a distributed fashion between facilities (ground-based and/or non-ground-based).

In some embodiments, however, the SBC may not have a sufficient amount of forward and/or return feeder link bandwidth to receive and/or transmit all necessary signals from/to a processing facility such as a ground facility. For example, if an SBC comprises 100 return service link antenna elements, and if the SBC communicates with radioterminals using, for example, an aggregate of 10 MHz of return service link spectrum, an aggregate of 100×10=1000 MHz=1 GHz of spectrum may have to be transported by the SBC, via a return feeder link, to a processing facility (e.g., a ground facility), such as a satellite gateway. This may be prohibitive if less than the required return feeder link spectrum of 1 GHz is available to the SBC. Furthermore, in some embodiments, at least some return service link antenna elements of the SBC may be configured to receive information from radioterminals using two different polarizations, that may be substantially orthogonal therebetween, such as, for example, a substantially Left Hand Circular Polarization (LHCP) and a substantially Right Hand Circular Polarization (RHCP), further increasing a bandwidth requirement of a return feeder link. In such embodiments, the return feeder link may be configured to transport information to a processing facility using two different polarizations such as, for example, a substantially Vertically-oriented (V-oriented) polarization and a substantially Horizontally-oriented (H-oriented) polarization. In some embodiments, for example, information received by the SBC from radioterminals via the substantially RHCP may be transported by the return feeder link to a processing facility using the substantially V-oriented polarization and information received by the SBC from radioterminals via the substantially LHCP may be transported by the return feeder link to the processing facility using the substantially H-oriented polarization. In addition, the information received by the SBC over the substantially RHCP and LHCP may be transported to the processing facility by the return feeder link over the substantially V-oriented and H-oriented polarizations, respectively, while maintaining substantial frequency alignment between information that is correlated and is being transported over the substantially V-oriented and H-oriented polarizations, respectively. That is, the RHCP and LHCP components of a signal received at one or more return link antenna element(s) of the SBC may contain substantially identical and correlated frequency content therebetween (i.e., a radioterminal configured to transmit substantially linearly-polarized electro-magnetic energy transmits approximately half of the energy in a substantially RHCP and approximately half of the energy in a substantially LHCP). As such, corresponding RHCP and LHCP signals received at the SBC that are correlated (include substantially identical frequency content) may be transported to the processing facility via, for example, the substantially V-oriented and H-oriented polarizations of a return feeder link, respectively, while maintaining substantial frequency alignment therebetween over the return feeder link. Thus, any leakage from one polarization into the other (as may be caused by atmospheric effects and/or by a non-ideally orthogonal state between the V-oriented and H-oriented polarizations of the return feeder link) may be leakage between two correlated components of a signal (i.e., between the RHCP and LHCP components of a signal as the two components are being transported to the processing facility by the return feeder link) and may thus be effectively utilized by a receiver at the processing facility that may be configured to combine the two components of the signal received over the feeder link's V-oriented and H-oriented dimensions.

In centralized architectures according to some embodiments of the invention, the SBC may be configured to form a plurality of return feeder link antenna patterns (beams or cells) to thereby reuse spatially at least some of the return feeder link spectrum and thus transport to the processing facility (e.g., to the ground), to geographically spaced apart facilities (gateways), information comprising all, or nearly all, of the information provided to the SBC by the (e.g., 100) return service link antenna elements of the SBC. If, for example, 250 MHz of return feeder link spectrum is available to the SBC, four return feeder link antenna patterns (beams) may be formed by the SBC to transport all, or nearly all, of the return service link antenna element information to a processing facility by sending one fourth, or approximately one fourth, of the total return service link antenna element information to each one of four respective spatially separated (e.g., geographically separated) processing facilities (gateways). (It is understood that if, for example, the SBC contained only, for example, 25 return service link antenna elements, each receiving an aggregate of 10 MHz of spectrum from radioterminals, only one return feeder link of 250 MHz of bandwidth would suffice to transport all, or nearly all, of the return service link antenna element information of the SBC to the processing facility).

The information of a return service link antenna element provided to a processing facility (gateway) by a respective return feeder link antenna pattern (beam) may be transported by the processing facility (gateway) to a common or centralized processing facility at which an aggregate of the information received by substantially all (e.g., 100) return service link antenna elements of the SBC may be processed to form at least one return service link antenna pattern (spot beam or cell). In transporting to the common processing facility by a processing facility (gateway) the information of return service link antenna elements provided to the processing facility (gateway) by a respective return feeder link antenna pattern (beam), at least some of the transported information may be delay-equalized to substantially align in time, at the common processing facility, information associated with at least a first and second return service link antenna element, transported to the common processing facility by respective first and second processing facilities (gateways). Corresponding to and/or analogously with the return link operations described above, forward link operations may be performed (in substantially reverse order compared with the return link operations described above) by the common processing facility, the (four) processing facilities (gateways) and/or the SBC to transport signals/information to at least some of a plurality of forward service link antenna elements of the SBC and form at least one forward service link antenna pattern (spot beam) by the SBC.

Accordingly, some embodiments of the invention can provide a centralized GBBF architecture and/or signal processing as described above, wherein the common processing facility (e.g., the common ground facility) can exercise control over substantially all service link frequencies available to the SBC. Systems, methods, satellites and/or satellite gateways may be provided.

Distributed GBBF architectures and/or signal processing according to other embodiments of the invention, can obviate or reduce the need to transport to/from the common processing facility, at least some of the information associated with return/forward service link antenna elements provided to a processing facility (gateway) by the SBC or the common processing facility. In accordance with a distributed GBBF architecture and/or signal processing, a processing facility (gateway) may exercise control over a frequency subset of the service link frequencies available to the SBC over an entire geographic service region of the SBC or over a subset of the entire geographic service region. Systems, methods, satellites and/or satellite gateways may be provided.

Moreover, according to other embodiments of the invention, a distributed GBBF architecture and/or signal processing may allow a first and second operator/user of the SBC to control and/or have access to respective first and second subsets of return and/or forward service link antenna elements of the SBC. The first and second operators/users of the SBC may exercise independent control of a given set of frequencies, that may be commonly used by the first and second operator/user of the SBC, over substantially non-overlapping first and second service regions of the SBC that may be associated with first and second service regions of the first and second operators/users of the SBC, respectively. In some embodiments, the first operator/user of the SBC is a US and/or Canadian operator/user of the SBC and the second operator/user of the SBC is Inmarsat, a Russian operator/user of the SBC and/or a Mexican operator/user of the SBC.

FIG. 1 illustrates a wireless communications system 100 according to some embodiments of the present invention. A space-based component SBC 110 is configured to support service links 112 with radioterminals 10 and feeder links 114a, 114b, 114c with a plurality of processing facilities 120a, 120b, 120c. As shown, respective ones of the feeder links 114a, 114b, 114c carry respective spectral components $f_a$, $f_b$, $f_c$ of service link communications (forward and/or return) for the radioterminals 10. In some embodiments of the present invention, the processing facilities 120a, 120b, 120c are spatially distributed (e.g., geographically distributed), and the feeder links 114a, 114b, 114c utilize respective spatially diverse antenna beams that allow for, at least some, feeder link frequency reuse. Frequency-shifting of the spectral components $f_a$, $f_b$, $f_c$ for transmission over the feeder links 114a, 114b, 114c may be used to enable such feeder link frequency reuse, which can provide for efficient use of the available feeder link spectrum, e.g., referring to FIG. 1, three spatially diverse beams each with a bandwidth X may be used to provide an effective feeder link bandwidth of 3X. The SBC 110 and the processing facilities 120a, 120b, 120c may be configured to provide complementary frequency translation operations to support such operations.

Figure 2:
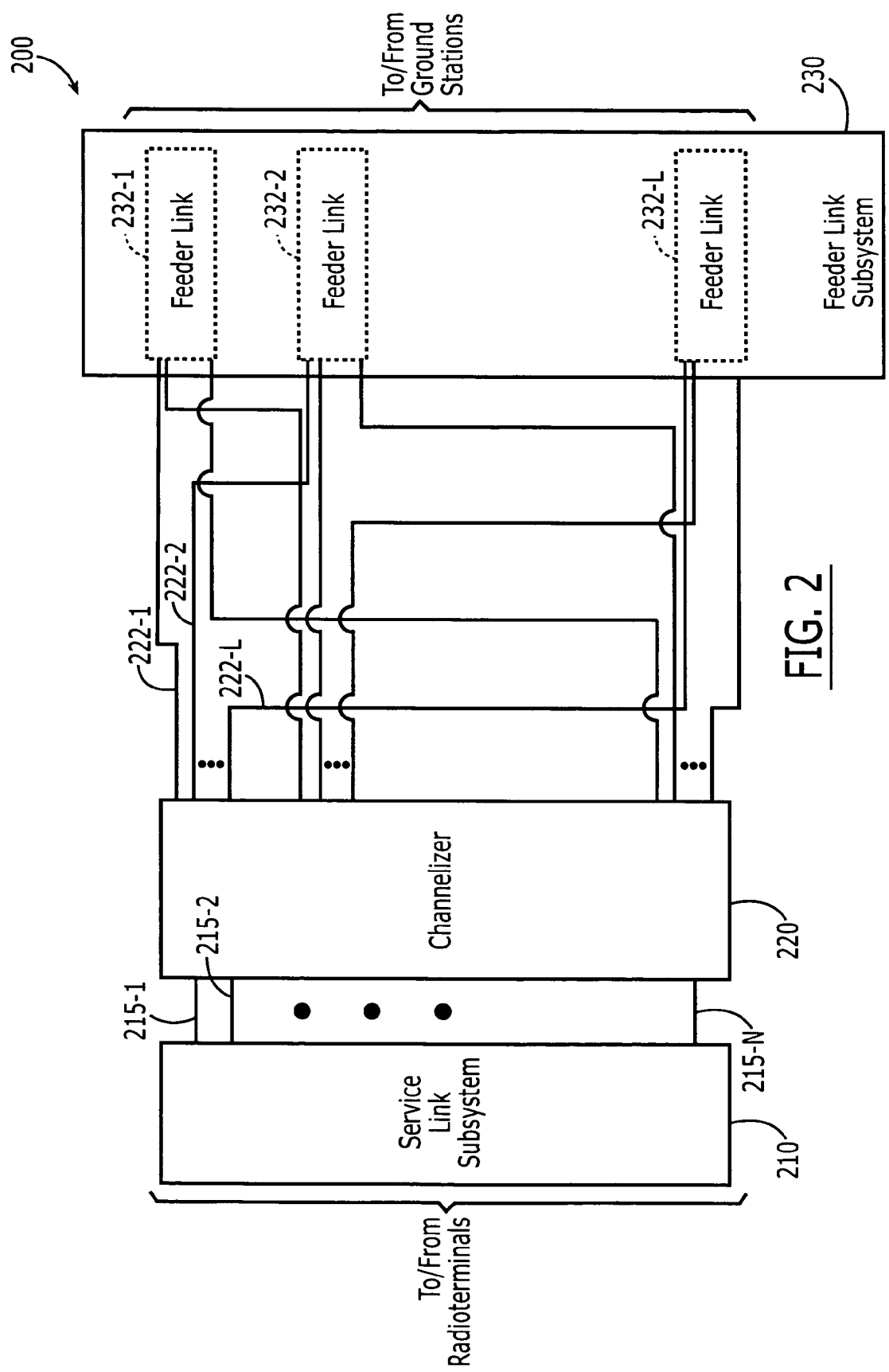
FIG. 2 is a schematic diagram illustrating a configuration for an SBC and operations thereof according to further embodiments of the present invention.

FIG. 2 illustrates an SBC 200 according to some embodiments of the present invention. The SBC 200 includes a service link subsystem 210 that provides service link communications to/from radioterminals. The service link subsystem 210 may include one or more service link antennas, antenna elements, antenna feed networks and/or other signal routing and/or processing apparatus for providing service link communications to/from radioterminals. The SBC 200 may further include a feeder link subsystem 230 that provides a plurality of feeder links 232-1, 232-2, . . . , 232-L to/from respective processing facilities that may be ground-based processing facilities. The feeder link subsystem 230 may include one or more feeder link antennas, antenna elements, antenna feed networks and/or other signal routing and/or processing apparatus for providing feeder link communications to/from the respective processing facilities. A channelizer 220 (that may comprise analog and/or digital elements) maps respective spectral components 222-1, 222-2, . . . 222-L of service link antenna elements 215-1, 215-2, . . . , 215-N of the service link subsystem 210 to respective ones of the feeder links 232-1, 232-2, . . . , 232-L of the feeder link subsystem 230. The mapping may comprise routing of L different spectral components of a return link signal at a service link antenna element 215-$j$ ($j=1, 2, \ldots, N$) to L respective feeder links 232-1, 232-2, ..., 232-L and/or routing of different spectral components of a forward link signals at a feeder link 232-$i$, ($i=1, 2, \ldots, L$), to respective ones of forward service link antenna elements. As such, letting Z denote the bandwidth of a spectral component, and defining each spectral component to be of the same bandwidth Z, a feeder link bandwidth of NZ is required, to be spatially reused L times, to transport to one or more processing facilities all, or substantially all, of the information/signals associated with the N return service link antenna elements of the SBC and/or to transport to the SBC forward link signals, intended for radioterminals, to be distributed over a number of forward service link antenna elements to provide antenna patterns (beams) for the radioterminals (preferably one antenna pattern per radioterminal that is substantially optimum for that radioterminal). It will be understood by those of skill in the art that the number of forward service link antenna elements of the SBC may be different compared to the number of return service link antenna elements of the SBC and that the channelizer 220 may also perform frequency translation operations that are complementary to operations performed by one or more of the processing facilities. Mappings by the channelizer 220 of signal components from service link antenna elements to feeder links and/or from feeder links to service link antenna elements other than the mappings specified above will also occur to those skilled in the art. Any mapping may be appropriate provided that corresponding bandwidths of feeder links and service links are accommodated by the mapping and the mapping provides for transferring all, substantially all or enough information from/to a SBC and to/from one or more processing facilities to provide for the formation of one or more service link antenna patterns, as needed. For example, a mapping may entail the placement of signals of a number of service link antenna elements side-by-side in frequency space (in a substantially non-overlapping fashion) until an available feeder link bandwidth is exhausted. The process may be repeated by spatially reusing the available feeder link bandwidth until all signals of all service link antenna elements have been accommodated. More specifically, if, for example, return service link emissions from radioterminals are limited (in the aggregate) to 10 MHz and the available return feeder link bandwidth is 250 MHz, up to 25 signals of 25 return service link antenna elements may be accommodated by a single use of the available return feeder link bandwidth. If the SBC comprises 100 return service link antenna elements, four spatially-diverse reuses of the available return feeder link bandwidth (250 MHz) would be needed to transport all return link antenna element signals to one or more processing facilities (e.g., gateways). In some embodiments, separation in frequency space and/or in polarization space may be used in transporting different signals corresponding to different antenna elements of the SBC from/to the SBC to/from one or more processing facilities.

Figure 3:
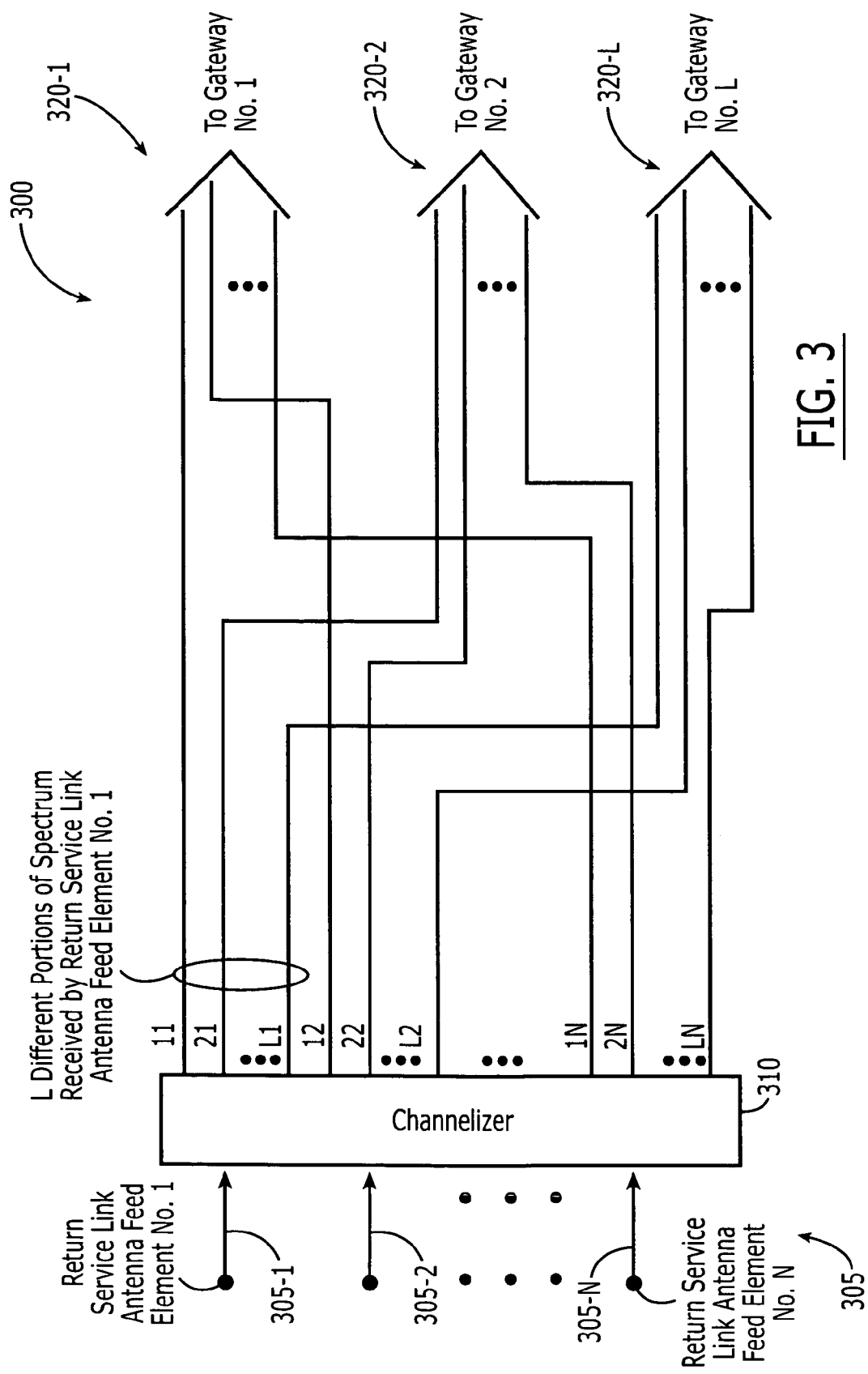
FIG. 3 is a schematic diagram illustrating return link processing apparatus and operations according to some embodiments of the present invention.

FIG. 3 illustrates elements of signal processing associated with N return service link antenna elements 305-1, 305-2, ..., 305-N of an antenna subsystem of a SBC 300 according to some embodiments of the present invention. In some embodiments, the SBC 300 may be, for example, a substantially geo-stationary orbiting satellite. Referring to FIG. 3, a return service link antenna element signal, such as, for example, signal 305-1 that is provided to a channelizer 310 may be decomposed by the channelizer 310 into L substantially non-overlapping frequency-domain components. As illustrated in FIG. 3, the channelizer 310 may be configured to provide the L substantially non-overlapping frequency-domain components of a given return service link antenna element signal over one or more output ports (i.e., over L output ports, as illustrated) in response to a given return service link antenna element signal being provided at an input port of the channelizer.

Figure 4:
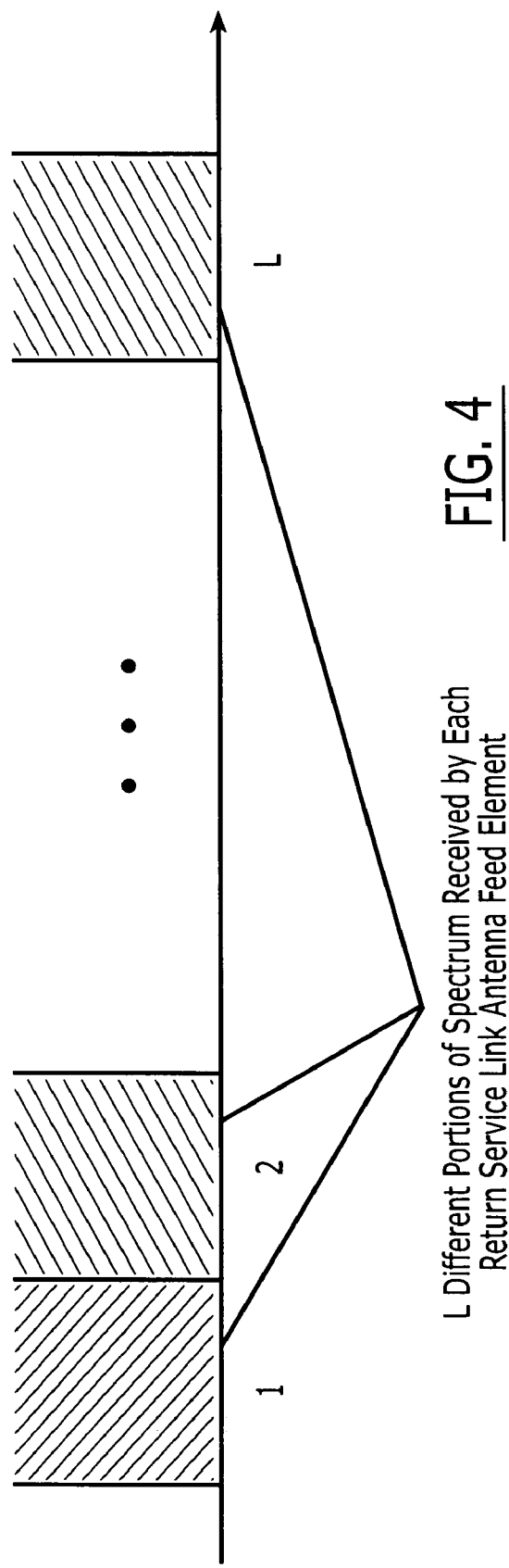
FIG. 4 illustrates exemplary assignment of spectral portions for feeder links in a communications system according to further embodiments of the present invention.

FIG. 4 illustrates the L substantially non-overlapping in the frequency-domain components of spectrum that may be provided at an output port (or ports) of the channelizer 310, over L substantially orthogonal and/or distinguishable dimensions, in response to a signal provided to the channelizer input by a return service link antenna element. It will be understood that, although L contiguous frequency-domain components are shown in FIG. 4, at least some of the components need not be contiguous. In some embodiments, the L substantially orthogonal and/or distinguishable dimensions may be and/or appear on L physically distinct channelizer output ports (leads) as illustrated in FIG. 3. In some embodiments, for a $j^{th}$ receive antenna element signal that is provided to a $j^{th}$ input port of the channelizer, the channelizer 310 may be configured to provide at a $j^{th}$ multi-dimensional (i. e., L-dimensional) output port an L-dimensional signal vector $\{1j, 2j, \ldots, Lj\}$; $1 \leq j \leq N$; whose components are distributed over (associated with) L respective dimensions. In some embodiments, the components of the signal vector $\{1j, 2j, \ldots, Lj\}$ may contain substantially non-overlapping frequency content and may be provided on L physically separate output ports (leads) of the channelizer 310 (as illustrated in FIG. 3).

In some embodiments, a channelizer, such as the channelizer 310 of FIG. 3, may use an Analog-to-Digital (A/D) converter, a Continuous-time-to-Discrete-time (C/D) converter, a Fast Fourier Transform (FFT), a Discrete-time Fourier Transform (DFT), a digital (discrete-time) filter and/or other digital components to generate the signal vector $\{1j, 2j, \ldots, Lj\}$. In other embodiments, a channelizer may include a bank of continuous-time (analog) filters and/or other analog components. These and other combinations of analog and/or digital components may be used. It will be understood that a return service link antenna element signal may, prior to being provided to a channelizer input port, be subjected to certain signal processing and/or signal conditioning operations, such as amplification, filtering and/or frequency translation (not necessarily in that order) which, for the sake of simplicity, are not shown in FIG. 3. Also, it will be understood that a signal that is provided to a return feeder link by an output port of the channelizer (for transmission to a ground facility (gateway)) may, prior to being transmitted, be subjected to certain signal processing/conditioning operations comprising amplification, filtering and/or frequency translation (not necessarily in that order) which, for the sake of simplicity, are not shown in FIG. 3. At least some of these signal processing/conditioning operations may be part of the channelizer in some embodiments.

Still referring to FIG. 3, a first N-dimensional signal vector $\{11, 12, \ldots, 1N\}$ comprising N components, each including a frequency content that extends over substantially a first portion of spectrum received by a corresponding return service link antenna element (see FIG. 4) may be provided to a first return feeder link antenna pattern (beam) for transmission to a first processing facility (gateway). In some embodiments, the first signal vector $\{11, 12, \ldots, 1N\}$ may be provided to the first return feeder link antenna pattern (beam) in a format wherein at least some of the components of the signal vector have been frequency translated such that each of the components of the signal vector at the first return feeder link antenna pattern (beam) occupy substantially different frequencies. A receiver at the first processing facility (gateway) may be configured to receive the signal vector and substantially re-align in frequency (bring in substantial frequency congruency) at least some, and in some embodiments all, of the N components. The $n^{th}$ component of the first N-dimensional signal vector $\{11, 12, \ldots, 1N\}$; n=1, 2, ..., N; may include a measure of signals occupying substantially the first portion of spectrum (see FIG. 4) and received by the $n^{th}$ return service link antenna element.

The operations described above relative to the first N-dimensional signal vector, whose N elements/dimensions/components comprise a measure of signals occupying substantially a first portion of spectrum and received by the N respective return service link antenna elements, may be repeated L-times, as illustrated in FIG. 3, forming L distinct N-dimensional signal vectors each corresponding to, and comprising measures of, signals received by the N return service link antenna elements and occupying respective L substantially non-overlapping portions of spectrum (see for example FIG. 4). More specifically, the $\lambda^{th}$ N-dimensional signal vector $\{\lambda 1, \lambda 2, \ldots, \lambda N\}$; $\lambda$=1, 2, ..., L; whose N elements/dimensions/components comprise a measure of signals received by the N respective return service link antenna elements, over substantially the $\lambda^{th}$ portion of spectrum used by the SBC to receive information from radioterminals, may be transmitted to a respective $\lambda^{th}$ processing facility (gateway) via a respective $\lambda^{th}$ return feeder link antenna pattern (beam) thereby providing the $\lambda^{th}$ processing facility (gateway) with sufficient information to exercise control over the signals received by the N return service link antenna elements over substantially the $\lambda^{th}$ portion of spectrum.

Control may be exercised by the $\lambda^{th}$ processing facility (gateway) by processing of at least some of the elements/dimensions/components of the signal vector $\{\lambda 1, \lambda 2, \ldots, \lambda N\}$; $\lambda$=1, 2, ..., L; provided to the $\lambda^{th}$ processing facility (gateway) by the $\lambda^{th}$ return feeder link antenna pattern (beam) to form at least one return service link antenna pattern (spot beam) and extract communications information of at least one radioterminal signal over the at least one return service link antenna pattern (spot beam) that is formed at the $\lambda^{th}$ processing facility (gateway) by processing the at least some of the elements/dimensions/components of the vector $\{\lambda 1, \lambda 2, \ldots, \lambda N\}$; $\lambda$=1, 2, ..., L. Processing the at least some of the elements, dimensions and/or components of the $N^{th}$ dimensional signal vector $\{\lambda 1, \lambda 2, \ldots, \lambda N\}$; $\lambda$=1, 2, ..., L; at the $\lambda^{th}$ processing facility (gateway) may, in some embodiments, comprise linear and/or non-linear operations comprising amplification, frequency translation, filtering (adaptive and/or fixed), interference suppression, channel estimation, multi-user detection, demodulation, de-interleaving, error detection and correction and/or other operations.

The $\lambda^{th}$ processing facility (gateway) may further be configured, in some embodiments, to perform corresponding and/or analogous operations to those described above but in substantially reverse order to the operations described above relative to processing the vector $\{\lambda 1, \lambda 2, \ldots, \lambda N\}$ at the $\lambda^{th}$ processing facility (gateway), to transport communications information to at least some forward service link antenna elements of the SBC to form at least one forward service link antenna pattern (spot beam) by the SBC to communicate information to at least one radioterminal over at least some frequencies of a $\lambda^{th}$ portion of forward service link frequencies, corresponding to the $\lambda^{th}$ portion of return service link frequencies, that the $\lambda^{th}$ processing facility (gateway) controls. More specifically, a communications signal at the $\lambda^{th}$ processing facility (gateway) that is destined for a specific radioterminal, whose geographic location is provided to, and/or is estimated by, the $\lambda^{th}$ processing facility (gateway), may be transmitted to the SBC by the $\lambda^{th}$ processing facility (gateway) over a $\lambda^{th}$ forward feeder link antenna pattern (beam) of the processing facility and/or the SBC.

In accordance with some embodiments of the present invention, a communications and/or signaling signal that is destined for a specific radioterminal may be transmitted to the SBC by the $\lambda^{th}$ processing facility (gateway) in the form of a $\mu$-dimensional signal vector $\{\lambda 1, \lambda 2, \ldots, \lambda \mu\}$; $\mu \leq M$=number of forward service link antenna elements of a forward service link antenna subsystem of the SBC. At the SBC the components of the vector $\{\lambda 1, \lambda 2, \ldots, \lambda \mu\}$ may be brought in substantial frequency congruence therebetween and distributed over $\mu$ forward service link antenna elements to form a forward service link antenna pattern (spot beam), that may be optimum or nearly optimum for the specific radioterminal, over one or more forward service link frequencies that is/are controlled by the $\lambda^{th}$ processing facility (gateway), as required, to transmit the signal that is intended for the specific radioterminal, to the specific radioterminal. The $\lambda^{th}$ processing facility (gateway) may, in some embodiments, command the SBC to reuse the one or more forward service link frequencies that the SBC is using to provide communications to the specific radioterminal, to provide communications to one or more other spatially diverse radioterminals.

The one or more other radioterminals may be at a distance from the specific radioterminal and from each other. The one or more other radioterminals and/or the specific radioterminal may be configured to provide information to the $\lambda^{th}$ processing facility (gateway) regarding a level of received interference at the radioterminal(s). Responsive to the level of received interference at the radioterminal(s) provided to the $\lambda^{th}$ processing facility (gateway) by the one or more other radioterminals and/or by the specific radioterminal the $\lambda^{th}$ processing facility (gateway) may be configured to modify a signal parameter intended for the one or more other radioterminals and/or the specific radioterminal to reduce interference at the one or more other radioterminals and/or at the specific radioterminal. In some embodiments, the $\lambda^{th}$ processing facility (gateway) may be configured to change at least one frequency that it uses to communicate information to the one or more other radioterminals and/or the specific radioterminal responsive to a level of received interference at the radioterminal(s) provided to the $\lambda^{th}$ processing facility (gateway) by the one or more other radioterminals and/or by the specific radioterminal.

Figure 5:
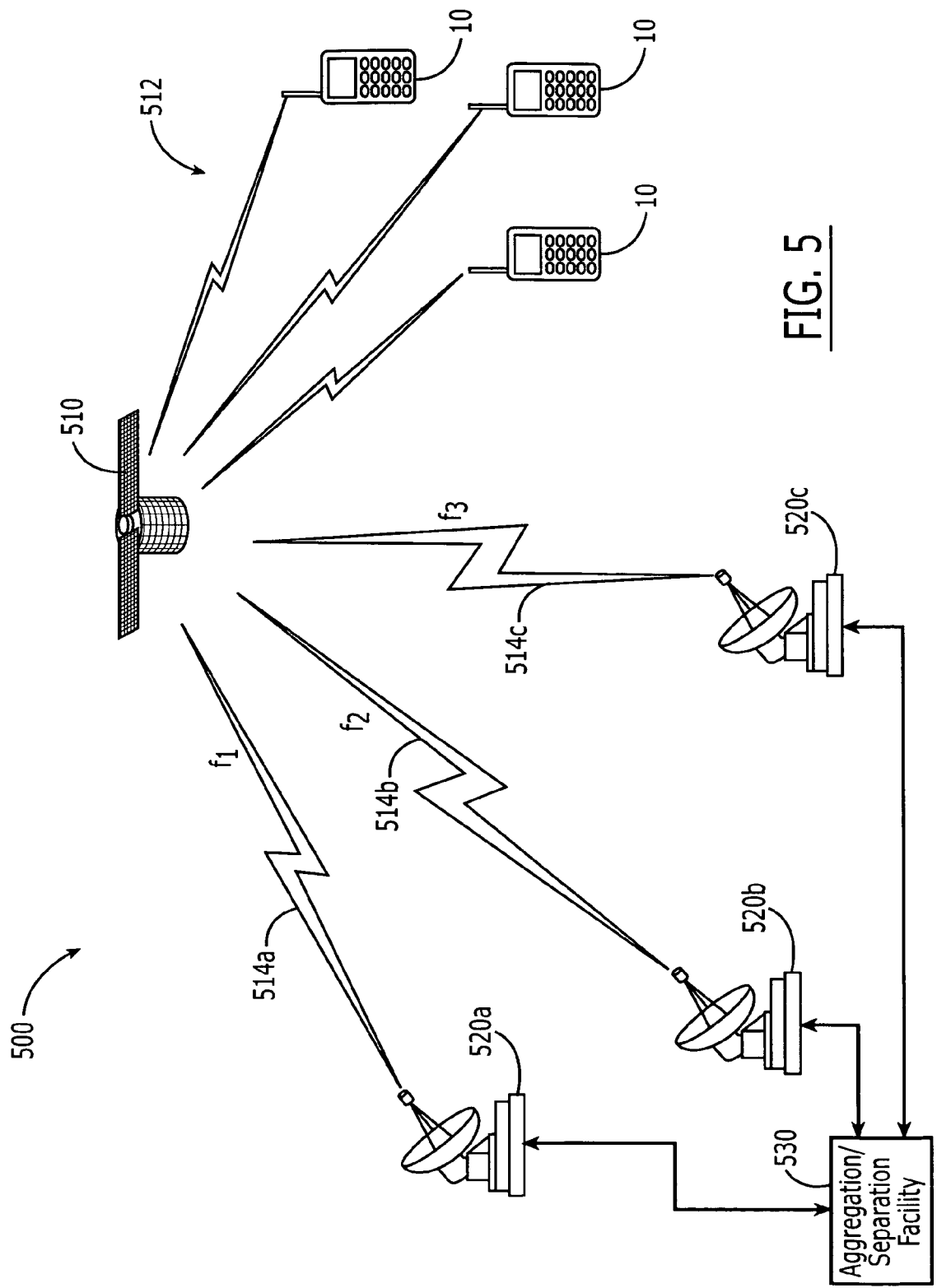
FIG. 5 is a schematic diagram illustrating aggregation of signals from a group of geographically distributed ground stations for a space-based component (SBC) of a communications system according to some embodiments of the present invention.

FIG. 5 illustrates a communications system 500 according to further embodiments of the present invention. As shown, an SBC 510 is configured to communicate with radioterminals 10 over service links 512. The SBC 510 is further configured to communicate with spatially distributed processing facilities 520a, 520b, 520c, which, along lines discussed above, may be served by respective spatially diverse feeder links 514a, 514b, 514c. The spatially diverse feeder links may be configured to provide respective spectral components $f_1$, $f_2$, $f_3$ of communications associated with radioterminals 10 and/or respective information associated with respective service link antenna elements. An aggregation/separation facility 530 is operatively associated with the processing facilities 520a, 520b, 520c. The aggregation/separation facility 530 may be configured, in some embodiments, to combine spectral components of return link communications of radioterminals 10 received by the SBC 510 and conveyed to the respective processing facilities 520a, 520b, 520c to recover return service link transmissions of the radioterminals 10. Alternatively, or in addition to such return link operations, the aggregation/separation facility 530 may be configured to separate an aggregate of forward link signals destined for radioterminals 10 for transmission to the SBC 510 by respective ones of the processing facilities 520a, 520b, 520c.

Figure 6:
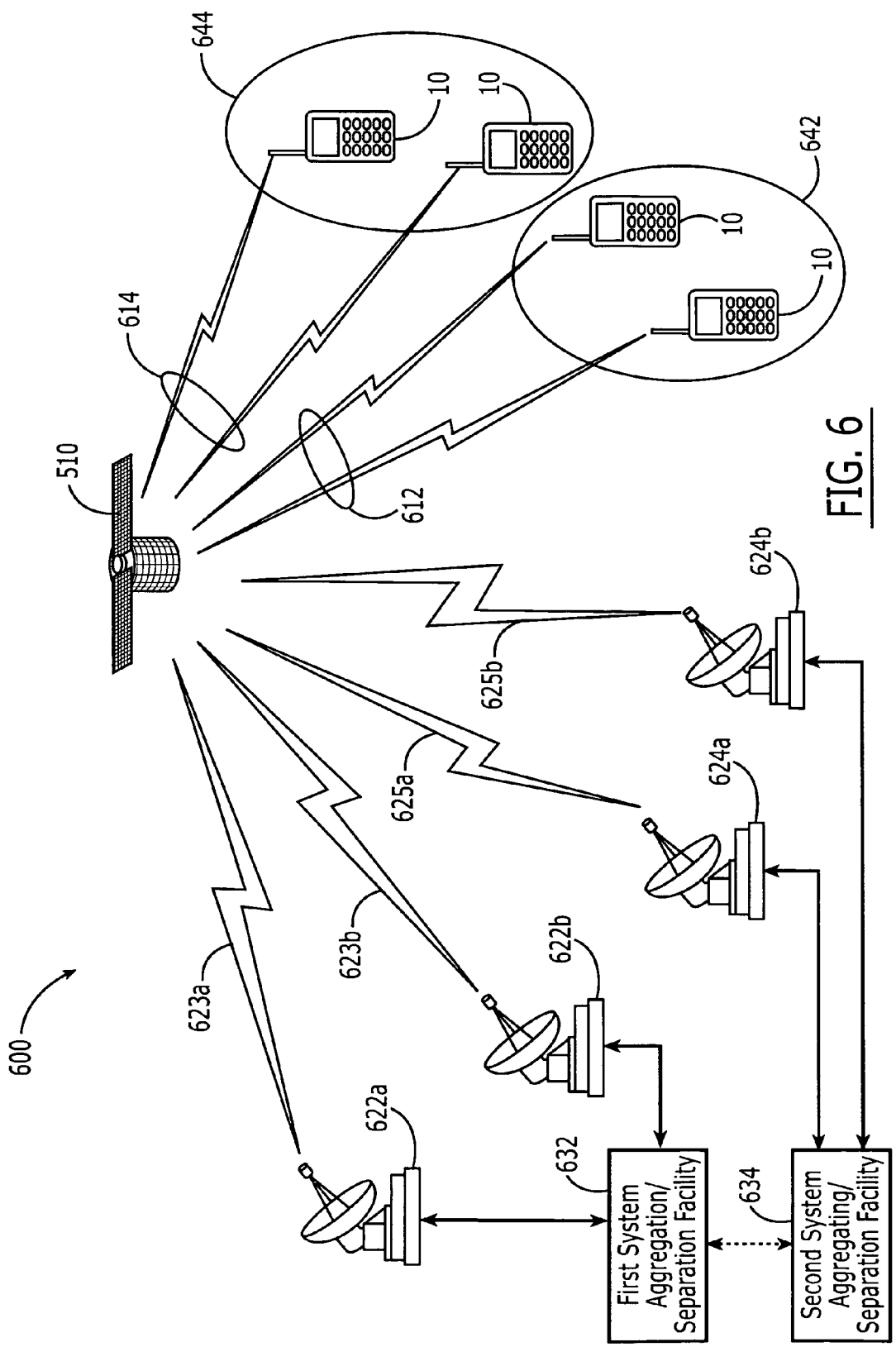
FIG. 6 is a schematic diagram illustrating aggregation of signals from geographically distributed ground stations for first and second communications systems using a common space-based component (SBC) according to some embodiments of the present invention.

In further embodiments of the present invention, an SBC may be configured to provide operations along the lines described above for multiple communications systems. FIG. 6 illustrates a communications system 600 according to some embodiments of the present invention, wherein an SBC 610 is configured to communicate over service links 612, 614 with radioterminals 10 in a first service region 642 of a first service provider and a second service region 644 of a second service provider. The service regions 642, 644 may be non-overlapping, substantially overlapping or at least partially overlapping. The service links 612, 614 may use, for example, substantially non-overlapping sets of frequencies and/or may use overlapping sets of frequencies (e.g., the first system may reuse frequencies of the second system over substantially non-overlapping service regions).

The SBC 610 communicates with respective processing facilities (e.g., gateways) 622a, 622b of the first system over respective feeder links 623a, 623b. The respective feeder links 623a, 623b carry respective spectral components of radioterminal communications for the first service region 642. Similarly, the SBC 610 communicates with respective processing facilities (e.g., gateways) 624a, 624b of the second system over respective feeder links 625a, 625b. The respective feeder links 625a, 625b carry respective spectral components of radioterminal communications for the second service region 644. Respective first and second aggregation/separation facilities 632, 634 may be provided and may be coupled to the first and second groups of processing facilities. The aggregation/separation facilities 632, 634 may operate along lines discussed above with reference to FIG. 5. In some embodiments of the invention, a communications link may be provided between the two aggregation/separation facilities (as illustrated in FIG. 6 by the dashed line). The communications link may be used to provide information relating to coordination and/or usage of frequencies and/or other information such as information relating to interference, traffic loading and/or formation of antenna patterns at a service region border. In some embodiments, there may be a frequency overlap of radioterminal signals used by first and second systems such that, for example, the first system aggregation/separation facility 632 may be able to extract a component of radioterminal communications of the second system from feeder return signals received from the SBC 610 by its associated ground stations 622a, 622b. In such a case, the first aggregation/separation facility 632 may be able to pass the extract signal content to the second system aggregation/separation facility 634 for combination with signal content received via the second system ground stations 624a, 624b. It will be appreciated that such operation may be reciprocal, and that a similar exchange may be used relative to forward link transmissions.

Figure 7:
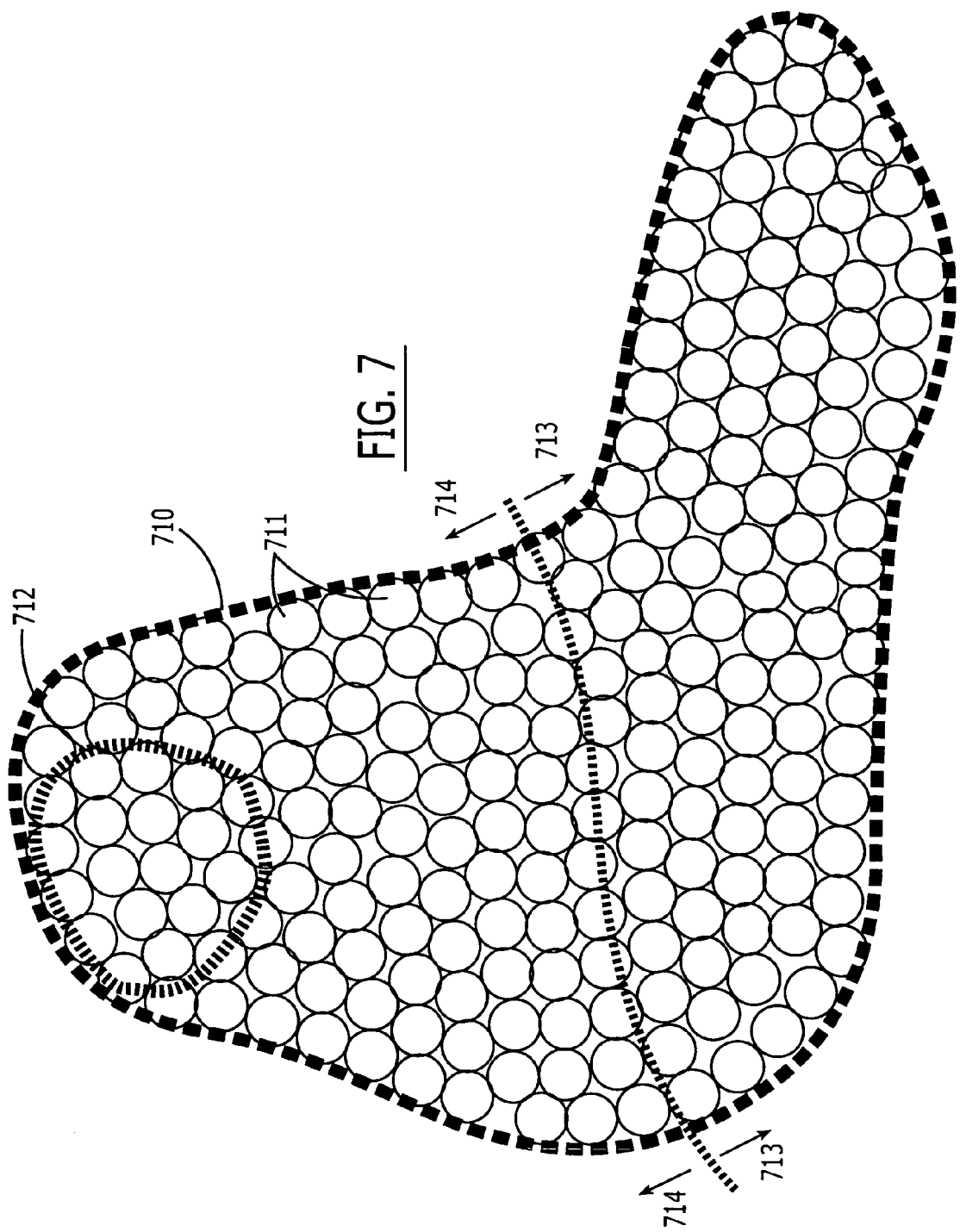
FIG. 7 illustrates assignment of service link elements and frequencies according to further embodiments of the present invention.

FIG. 7 illustrates a service link antenna element array of a service link antenna subsystem of a SBC according to some embodiments of the present application. The antenna subsystem may be a return and/or forward service link antenna subsystem of the SBC. FIG. 7 illustrates a set 710 of N service link antenna elements 711 that may be used by a first operator/service provider and/or first system to provide service over a service region associated with the first operator/service provider and/or first system. FIG. 7 also illustrates that a subset 712 of the total number of service link antenna elements may be used to form a given service link antenna pattern such as a spot beam (upper corner of drawing) and that a subset 713 of the total number of service link antenna elements may be used by a second operator/service provider and/or second system to form one or more service link antenna pattern(s), such as one or more spot beams and/or cells/beams, over a respective service region that is associated with the second operator/service provider and/or second system. The service region associated with the second operator/service provider and/or second system may be a subset of the service region associated with the first operator/service provider and/or first system. The service region associated with the second operator/service provider and/or second system may be substantially overlapping, partially overlapping or non-overlapping with the service region associated with the first operator/service provider and/or first system. The second operator/service provider and/or second system may be authorized to provide service using a second set of service link frequencies and the first operator/service provider and/or first system may be authorized to provide service using a first set of service link frequencies. The first and second sets of service link frequencies may contain substantially different service link frequencies.

In some embodiments, it may be desirable for at least one of the two operators/service providers and/or systems to use and/or reuse one or more of the service link frequencies of the other to provide communications service(s) over a respective service region of the operator/service provider and/or system. For example, it may be desirable for the first operator/service provider and/or system to use and/or reuse at least some of the service link frequencies of the second operator/service provider and/or system to provide communications service(s) over a service region associated with the first operator/service provider and/or system that does not substantially overlap with a service region of the second operator/service provider and/or system while the second operator/service provider and/or system uses all or some of the second set of service link frequencies to provide communications service(s) over a service region of the second operator/service provider and/or system that does not substantially overlap with a service region of the first operator/service provider and/or system over which the first operator/service provider and/or system is using and/or reusing the at least some of the service link frequencies of the second operator/service provider and/or system to provide communications service(s). For example, a set 714 of return service link elements may be used by the first operator/service provider and/or first system over a portion of a service region of the first system using frequencies that are used by the second operator/service provider and/or second system. In some embodiments, a first operator/service provider and/or system may provide service over a total service region using a first set of frequencies and substantially all of the service link antenna elements illustrated in FIG. 7 (i.e., substantially all antenna elements 714 and 713), while a second operator/service provider and/or system may provide service using a second set of frequencies, that may be distinct from the first, over a subset of the total service region using a subset of the service link antenna elements illustrated in FIG. 7 (e.g., antenna elements 713). The first operator/service provider and/or system may also provide service over a service region that does not substantially overlap with the service region of the second operator/service provider and/or system using/reusing the second set of frequencies.

Figure 8:
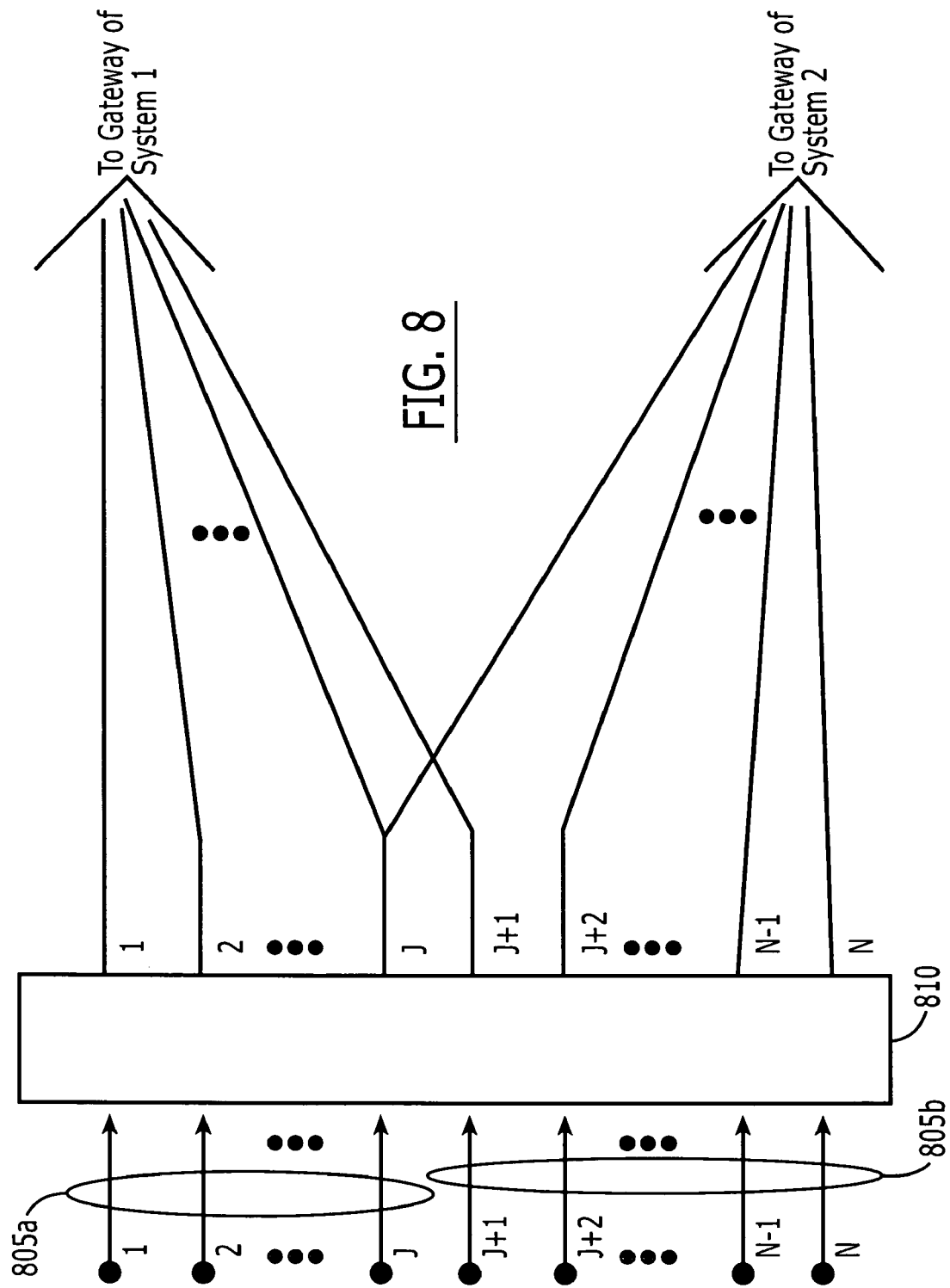
FIG. 8 is a schematic diagram illustrating return link processing apparatus and operations according to further embodiments of the present invention.

FIG. 8 illustrates selective routing of return service link signals on service link antenna elements 805a, 805b that have been identified by a channelizer 810 as occupying return service link frequencies belonging to and/or used by the second operator/service provider and/or system to provide communications according to some embodiments of the invention. The routing is selective, based on a return service link antenna element index, to a processing facility (e.g., gateway) of the second operator/service provider and/or system and/or to a processing facility of the first operator/service provider and/or system to thereby allow the first and second operator/service provider and/or system to receive communications independently from respective first and second radioterminals over respective first and second substantially non-overlapping service regions commonly using at least one frequency of the second operator/service provider and/or system. In FIG. 8, signals from at least two return service link antenna elements J and J+1 may be routed to both processing facilities (e.g., gateways) to provide additional flexibility in forming antenna patterns (e.g., beams/cells and/or spot beams) at, or near, a border between the two operators/service providers and/or systems. The selective return service link routing of signals illustrated in FIG. 8 may also be performed in substantially reverse order (from a first and second processing facility (gateway) of the first and second operator/service provider and/or system, respectively, to the forward service link antenna elements of the SBC) to thereby also allow the first and second operators/service providers and/or systems to transmit communications independently to respective first and second radioterminals over respective first and second substantially non-overlapping service regions while commonly using and/or reusing at least one frequency authorized to and/or used by the second operator/service provider and/or system to provide forward service link communications.

Whether or not the first and second operators/service providers and/or systems are configured to transmit and/or receive communications independently to/from respective first and second radioterminals over respective first and second substantially non-overlapping service regions commonly using at least one frequency authorized to and/or used by the second operator/service provider and/or system, an Ancillary Terrestrial Network (ATN) comprising at least one Ancillary Terrestrial Component (ATC) and at least one ATC radioterminal of the first operator/service provider and/or system may be configured to communicate using some or all of the frequencies authorized to and/or used by the second and/or first operator/service provider and/or system. The use of an ATN to terrestrially use/reuse satellite frequencies is described in U.S. Pat. No. 6,684,057 to Karabinis, entitled Systems and Methods for Terrestrial Reuse of Cellular Satellite Frequency Spectrum; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,785,543 to Karabinis, entitled Filters for Combined Radiotelephone/GPS Terminals; and Published U.S. Patent Application No. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

The first operator/service provider and/or system may deploy a SBC comprising first and second satellites such as, for example, first and second substantially geo-stationary satellites. In some embodiments, the first and second satellites may be configured to transmit communications to radioterminals using respective first and second forward service link bands of frequencies that are spaced apart (are substantially non-overlapping) and belong to one or more satellite frequency bands (such as an L and/or S satellite frequency band(s)) or belong to different satellite frequency bands, and receive communications from radioterminals using first and second return service link bands of frequencies corresponding to the first and second forward service link bands of frequencies to thereby enable diversity combining of signals received by the first and second satellites and transmitted to one or more processing facilities (e.g., satellite gateways).

In some embodiments, the first and/or second forward and/or return service link bands of frequencies may be substantially contiguous or non-contiguous bands of frequencies and may each comprise an aggregate bandwidth that is sufficiently small to allow the SBC channelizer(s) to be configured as analog channelizer(s). In some embodiments, the aggregate bandwidth may be less than or equal to approximately 12 MHz. A configuration of the SBC channelizer(s) as analog channelizer(s) may, in some embodiments, result in transmitting to a processing facility (gateway) at least some signal content of an other operator/service provider and/or system in addition to the signal content of a desired operator/service provider and/or system. The processing facility (gateway) may, in some embodiments, be configured to substantially ignore and/or discard all or at least some of the signal content of the other operator/service provider and/or system. In other embodiments, the processing facility (gateway) may be configured to substantially separate and forward the signal content of the other operator/service provider and/or system to the other operator/service provider and/or system. In further embodiments, the SBC may comprise a forward service link beam forming network which, in response to a signal received from a processing facility (gateway) forms a multi-dimensional signal whose components are used to provide inputs to a plurality of forward service link antenna elements to thereby form a forward service link antenna pattern (spot beam or cell). The SBC may thus be configured with a forward service link antenna pattern (beam) forming network but may not be configured with a return service link antenna pattern (beam) forming network to thereby reduce a complexity, reliability and/or cost measure of the SBC. The return service link beamforming network may be provided at one or more processing facilities (e.g., gateways) in accordance with one or more of the embodiments disclosed hereinabove and/or variations/combinations thereof that will occur to those skilled in the art.

An overall Space-Based Network (SBN) comprising a SBC and a plurality of processing facilities (gateways) may be configured with a Central Processing Facility (CPF) wherein the CPF is configured to maintain a record of traffic of at least one and, in some embodiments, of each one of the plurality of processing facilities (gateways). In some embodiments, at least one of the plurality of processing facilities (gateways) is operatively connected to the CPF and informs the CPF of a measure of traffic that the at least one of the processing facilities (gateways) is supporting, has supported and/or plans to support. Responsive to this information and/or other input(s), such as quality-of-service inputs, the CPF may be configured to route forward link traffic that has originated and/or is being initiated outside and/or inside of the SBN and is destined for a radioterminal or radioterminals of the SBN to a processing facility (gateway) that is supporting a minimum, near minimum and/or less than a maximum traffic and/or otherwise is capable of supporting the forward link traffic that has originated and/or is being initiated outside and/or inside of the SBN.

In some embodiments, all forward link traffic that originates and/or is initiated outside of the SBN and is destined for one or more radioterminals of the SBN is provided to the CPF and is routed by the CPF to one or more processing facilities (gateways) of the SBN to be further processed and transmitted to the one or more destination radioterminals of the SBN. Return link traffic that originates and/or is initiated by a radioterminal of the SBN may, in some embodiments, be supported by a processing facility (gateway) that is spatially more proximate or most proximate (compared to other processing facilities (gateways)) to a destination associated with the communications that is/are originated and/or initiated by the radioterminal of the SBN and/or is capable of supporting the communications that is/are originated and/or initiated by the radioterminal of the SBN. Accordingly, the CPF may be configured to process at least some requests for initiation of communications of radioterminals of the SBN and responsive to at least one spatial proximity measure related to the initiating radioterminal and destination(s) of communications thereof, a traffic measure of at least one processing facility (gateway) and/or an ability of at least one processing facility (gateway) to support traffic at a specified quality-of-service, instruct a processing facility (gateway) to support the communications that is/are originating and/or being initiated by the radioterminal of the SBN to thereby establish communications between the radioterminal of the SBN and the destination(s) thereof.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A space-based component (SBC) of a communications system, the SBC comprising:
   a plurality of service link antenna elements configured to transmit/receive information to/from radioterminals;
   a plurality of feeder links each providing information to/from a respective processing facility; and a
   channelizer configured to map different spectral components of a service link signal received at the SBC via a service link antenna element to different feeder links of the plurality of feeder links and/or to map different spectral components of a feeder link signal received at the SBC via a feeder link to different service link antenna elements;
   wherein the plurality of service link antenna elements comprises a first group of service link antenna elements corresponding to a first service region of the SBC and a second group of service link antenna elements corresponding to a second service region of the SBC, and wherein the channelizer is configured to map different spectral components of a service link signal received at the SBC by a service link antenna element of the first group of service link antenna elements to different feeder links of a first group of feeder links and to map different spectral components of a service link signal received at the SBC by a service link antenna element of the second group of service link antenna elements to different feeder links of a second group of feeder links.

2. The SBC of claim 1, wherein the channelizer is further configured to map different polarization components of a service link signal received at the SBC to different polarization components of a feeder link.

3. The SBC of claim 1, wherein at least some of the feeder links reuse feeder link frequencies.

4. The SBC of claim 1, wherein the channelizer is further configured to frequency translate service link signal components routed between the service link antenna elements and the feeder links.

5. The SBC of claim 1, further comprising a feeder link subsystem configured to provide a plurality of spatially diverse antenna patterns for the plurality of feeder links.

6. The SBC of claim 1, wherein the first and second service regions are substantially non-overlapping service regions served by respective first and second service providers.

7. The SBC of claim 6, wherein the channelizer is further configured to map different spectral components of a service link signal received at the SBC by a service link antenna element of the second group of service link antenna elements to different feeder links of the first group of feeder links.

8. The SBC of claim 7, wherein the first and second service providers are allocated first and second sets of frequencies, and wherein the first service provider uses at least one frequency of the second set of frequencies to provide service to at least a portion of the first service region.

9. The SBC of claim 8, wherein the first and second sets of frequencies are frequencies of a L-band and/or S-band.

10. A communications system comprising the SBC of claim 1 and a plurality of processing facilities.

11. The communications system of claim 10, further comprising an aggregation facility configured to receive return feeder link signals from the plurality of processing facilities and to combine elements of the received return feeder link signals to recover return service link signals therefrom.

12. The communications system of claim 10, further comprising a separation facility configured to separate an aggregate of forward link communications into components and to provide respective ones of the components to respective ones of the plurality of processing facilities for transmission to the SBC.

13. The communications system of claim 10, wherein the channelizer is configured to frequency translate service link signal components routed between the service link antenna elements and the feeder links, and wherein the plurality of processing facilities are configured to perform complementary frequency translations.

14. A method of operating a communications system, the method comprising:
   mapping different spectral components of a service link signal received at a space-based component (SBC) of the communications system via a service link antenna element of the SBC to different feeder links between the SBC and respective processing facilities; wherein the SBC comprises a plurality of service link antenna elements comprising a first group of service link antenna elements corresponding to a first service region and a second group of service link antenna elements corresponding to a second service region, and wherein mapping different spectral components of a service link signal received at a space-based component (SBC) of the communications system via a service link antenna element of the SBC to different feeder links between the SBC and respective processing facilities comprises mapping different spectral components of a service link signal received at a service link antenna element of the first group of service link antenna elements to different feeder links of a first group of the feeder links and mapping different spectral components of a service link signal received at a service link antenna element of the second group of service link antenna elements to different feeder links of a second group of the feeder links.

15. The method of claim 14, comprising frequency translating service link signal components routed between service link antenna elements and feeder links.

16. The method of claim 14, comprising using respective spatially diverse antenna patterns for respective feeder links.

17. The method of claim 14, wherein at least some feeder links reuse feeder link frequencies.

18. The method of claim 14, wherein mapping different spectral components of a service link signal received at a space-based component (SBC) of the communications system via a service link antenna element of the SBC to different feeder links between the SBC and respective processing facilities comprises mapping different spectral components of a service link signal received at the SBC via a service link antenna element to different feeder links and/or mapping different spectral components of a feeder link signal received at the SBC via a feeder link to different service link antenna elements.

19. The method of claim 14, wherein the first and second service regions are substantially non-overlapping service regions served by respective first and second service providers.

20. The method of claim 14, further comprising mapping different spectral components of a service link signal received at the SBC by a service link antenna element of the second group of service link antenna elements to different feeder links of the first group of feeder links.

21. The method of claim 20, wherein the first and second service providers are allocated first and second sets of frequencies, and wherein the first service provider uses at least one frequency of the second set of frequencies to provide service to at least a portion of the first service region.

22. The method of claim 21, wherein the first and second sets of frequencies are frequencies of a L-band and/or S-band.

23. The method of claim 14, further comprising receiving return feeder link signals over a plurality of feeder links at a respective plurality of processing facilities and combining elements of the received return feeder link signals to recover return service link signals therefrom.

24. The method of claim 14, further comprising separating an aggregate of forward link communications into components and providing respective ones of the components to respective ones of processing facilities for transmission to the SBC.

25. The method of claim 14, further comprising frequency translating service link signal components routed between service link antenna elements and feeder links and performing a complementary frequency translation at processing facilities.

* * * * *